Feb. 3, 1931. E. C. BALLMAN 1,791,261
MOTOR MOUNTING
Filed Oct. 28, 1926

Inventor:
Edwin C. Ballman,
by John W. Bruninga
His Attorney.

Patented Feb. 3, 1931

1,791,261

UNITED STATES PATENT OFFICE

EDWIN C. BALLMAN, OF ST. LOUIS, MISSOURI

MOTOR MOUNTING

Application filed October 28, 1926. Serial No. 144,851.

This invention pertains to means for damping the noise of an electric motor so as to prevent its being amplified or communicated to surrounding objects. More particularly the invention relates to means for mounting a motor so as to damp its vibration.

One of the objects of this invention is to provide a motor mounting which will be resilient so as to absorb the vibrations of the motor and which at the same time will provide a secure fastening which will keep the motor in place.

Another object is to provide such a mounting which will be simple and economical to manufacture and reliable in service.

Further objects will appear from the following description taken in connection with the accompanying drawing, in which Figure 1 is a side view of the motor showing a mounting embodying this invention;

Figure 1:
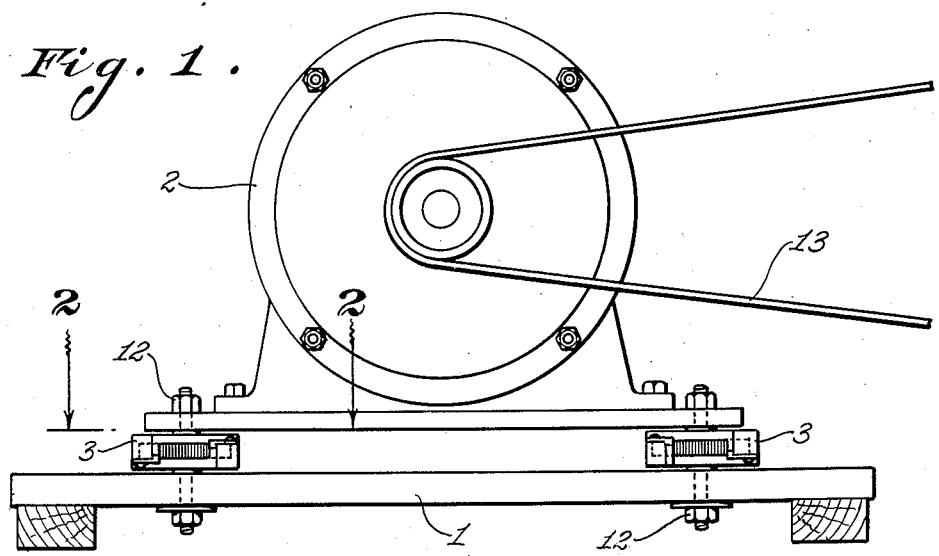

Referring to the drawing, 1 designates a base or support of any suitable kind upon which the motor 2 is to be mounted. Interposed between the base 1 and the motor 2 is a securing device indicated generally at 3. The device 3 comprises a pair of similar brackets 4 adapted to enclose or secure between them a resilient pad 5 of rubber or other suitable material. Each bracket 4 is provided with a body 6 which has formed thereon or suitably fixed thereto a fastening element 7, shown in the drawing as a screw. The ends of the body portion 6 are formed with upstanding angular flanges 8 adapted to provide a socket into which the pad 5 may be fitted at diagonally opposite corners. After the pad has been fitted into this socket, a retainer 9 is placed over the corner of the pad and secured by a screw or other fastening 10 to the bracket 4. This retainer 9 may have downwardly extending ears 11 fitting over the ends of the flanges 8 so as to hold the retainer in place.

Figure 2:
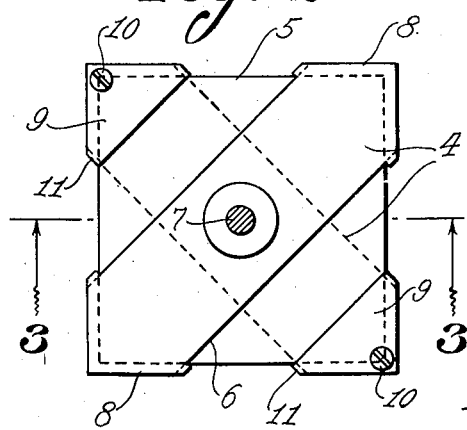
Figure 2 is a plan view of the motor mounting shown in Figure 1.

The two brackets 4, as described, are secured to each pad 5, but arranged in crossed relation, as shown in Figure 2, so as to engage different pairs of diagonally opposite corners of the pad. The motor 2 is then mounted on one or more of these pads, as illustrated in Figure 1. The pad is bolted to the base by passing one of the fasteners 7 therethrough and applying a nut 12 to its lower end, and the motor is then secured to the other fastener 7 as illustrated. When so mounted the vibrations of the motor will be taken up by the resilient pads 5 and will, therefore, not be communicated to the base 1. Consequently, any hum or noise which the motor may make during its operation will be damped out and the operation of the motor rendered practically quiet. This mounting not only supports the weight of the motor and absorbs its vibration, but is capable of securely holding the motor against the pull of the belt 13. In the embodiment shown in Figure 4, the fasteners 7 are secured to plates 14, which in turn are vulcanized to a rubber pad 15. The mounting is applied to the motor in a manner similar to that described for Figure 2.

Figure 4:
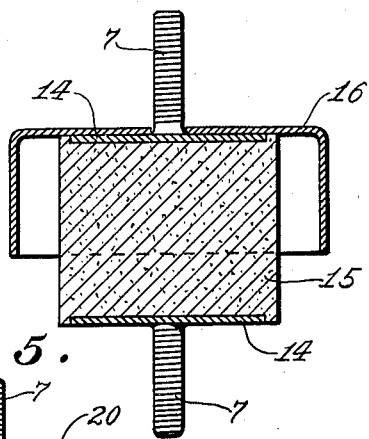
Figure 4 is a sectional view illustrating another embodiment of this invention.

In Figure 4 there is shown a guard or protector 16, which is simply a metal cup perforated so as to pass over the fastener 7. The cup is inverted so as to extend over and form a protecting canopy for the pad 15. Such a cover is of advantage where oil is liable to drip from the motor, in which case the rubber 15 will be protected from the oil and consequent deterioration. Such a guard 16 may be applied to any of the embodiments shown in Figures 2 to 5 in a similar manner.

Figure 5:
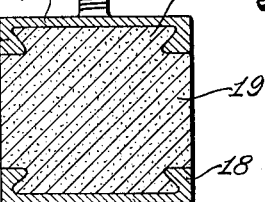
Figure 5 is a sectional view illustrating still another embodiment of this invention.
Figure 3:
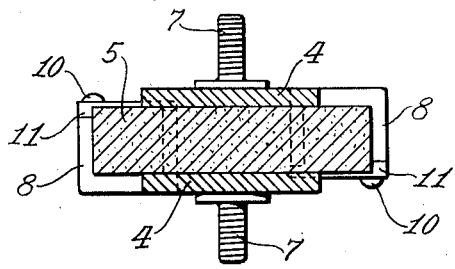
Figure 3 is a section on line 3—3 of Figure 2.

In the embodiment of Figure 5, each fastener 7 is equipped with a plate 17 having formed thereon an inwardly extending annular flange 18 so as to form a socket. A rubber pad 19 is cast into a pair of fasteners so as to provide projections 20 formed by the flanges 18. This fastener is applied in the same manner as described above.

It is obvious that various changes may be made in the details of construction without departing from the spirit of this invention;

it is to be understood, therefore, that this invention is not limited to the specific details shown and described.

Having thus described the invention, what is claimed is:

1. A mounting device for damping vibrations, comprising, a resilient block, brackets independently secured to opposite faces of said block, fastening elements on said brackets, and a means on one of said brackets for restraining said block against distortion.

2. A mounting device for damping vibrations, comprising, a resilient block, similar brackets each detachably secured to opposite faces of said block, said brackets being in crossed relation and fastening elements carried by each of said brackets and extending in different directions from said block.

3. A mounting device for damping vibrations, comprising, a resilient block, brackets secured to opposite faces of said block, and a canopy carried by one of said brackets for protecting the block.

In testimony whereof I affix my signature this 24th day of Sept., 1926.

EDWIN C. BALLMAN.